C. T. McLAUGHLIN.
PIE COVER.
APPLICATION FILED MAR. 15, 1915.

1,180,782.

Patented Apr. 25, 1916.

Witnesses

Inventor
CARRIE T. MCLAUGHLIN

UNITED STATES PATENT OFFICE.

CARRIE T. McLAUGHLIN, OF ARKANSAS CITY, KANSAS.

PIE-COVER.

1,180,782.  Specification of Letters Patent.  Patented Apr. 25, 1916.

Application filed March 15, 1915. Serial No. 14,556.

*To all whom it may concern:*

Be it known that I, CARRIE T. McLAUGHLIN, a citizen of the United States, residing at Arkansas City, in the county of Cowley and State of Kansas, have invented certain new and useful Improvements in Pie-Covers, of which the following is a specification, reference being had to the accompanying drawings.

This invention relates to an improved cover for pies, and has for its primary object to provide a device to cover and protect the edge of the pie crust and prevent the same from burning.

The invention has for a further object to provide a device for the above purpose which may be inexpensively constructed from sheet tin or like metal and may be easily and quickly applied to the edge of the pie plate or removed therefrom.

Figure 1:
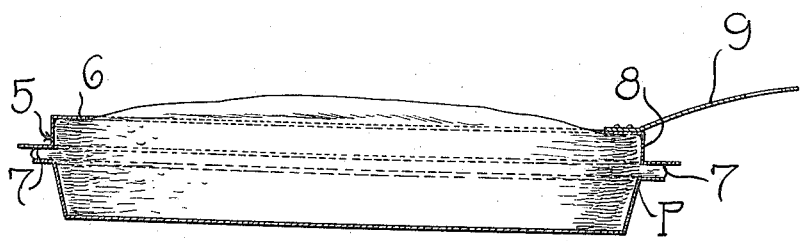
Figure 2:
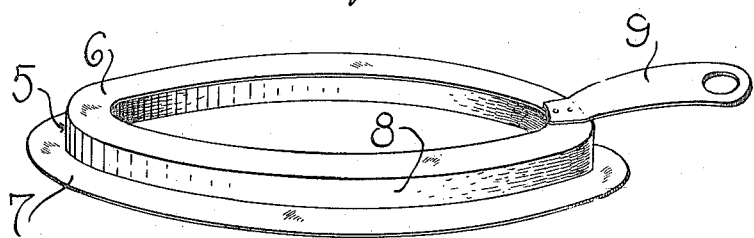

With the above and other objects in view, my invention consists in the novel features of construction, combination, and arrangement of parts to be hereinafter more fully described, claimed, and illustrated in the accompanying drawing, in which, Figure 1 is a sectional view showing my improved pie cover or protecting device applied to a pie; and Fig. 2 is a perspective view of the pie cover.

Referring in detail to the drawing, 5 designates the body of the device which is constructed of sheet tin or other metal and includes an inner annular flange 6, an outwardly projecting annular flange 7, and a vertical body wall 8 which connects the outer edge of the flange 6 with the inner edge of the flange 7. To the inner flange 6, a suitable handle member, indicated at 9, is riveted or otherwise secured.

In Fig. 1 of the drawing, I have shown the device as applied in actual use, and in said figure, P designates the pie plate in which the pie is placed and provided with a cover of dough in the usual manner. In applying the device, the laterally projecting flange 7 is engaged upon the outer end of the pie crust while the inwardly projecting flange 6 extends over the edge of the pie in spaced relation thereto. Thus, the pie crust is given plenty of room to rise while, at the same time, the flange 6 protects the edge of the crust from the intense heat of the oven and prevents the same from burning. The pie crust is, however, properly baked, as the major portion of the pie crust or cover is exposed to the action of the heat through the large opening defined by the annular flange 6. The vertical wall 8 is of such diameter and the flange 7 of sufficient width to admit of the use of the device in connection with pie pans of several different sizes. The protector may be advantageously employed in baking pies having only a single body crust of dough which constitutes the container for the pie ingredients or when the pie is provided with a covering crust, as shown in the drawing. The device may also be used in the baking of cakes and other pastry.

From the foregoing description, taken in connection with the accompanying drawing, the construction, manner of use, and several advantages of my invention will be clearly and fully understood. It is, of course, apparent that the pie covers or protecting devices may be made in various sizes so as to properly fit pie plates of different diameters. The device may be very cheaply manufactured and is highly efficient and serviceable in practical use.

While I have shown the preferred form and construction of the device, it will be understood that the same is susceptible of considerable modification, and I, therefore, reserve the privilege of resorting to all such legitimate changes as may be fairly embodied within the spirit and scope of the invention as claimed.

Having thus fully described my invention, what I desire to claim and secure by Letters Patent is:—

In combination with a pie plate, a cover therefor comprising an annular member of a maximum diameter in excess of the maximum diameter of the pie plate, said annular member being substantially Z-shape in cross section to afford horizontal flanges projecting in opposite directions, with the lower and outwardly disposed flange adapted to overlie the marginal portion of the pie plate, and an outwardly disposed handle member fixed in one of its ends to the upper and inwardly disposed flange, the diameter of the medial portion of the annular member being substantially the same as the diameter of the body of the pie plate.

In testimony whereof I hereunto affix my signature in the presence of two witnesses.

CARRIE T. McLAUGHLIN.

Witnesses:
L. S. INGALSBE,
THOMAS BAIRD.